(12) United States Patent
Tateno

(10) Patent No.: US 7,254,459 B2
(45) Date of Patent: Aug. 7, 2007

(54) BENDING PROCESS ESTIMATION APPARATUS, BENDING PROCESS ESTIMATION PROGRAM, AND BENDING PROCESS ESTIMATION METHOD

(75) Inventor: Tadashi Tateno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/318,602

(22) Filed: Dec. 28, 2005

(65) Prior Publication Data
US 2007/0067060 A1 Mar. 22, 2007

(30) Foreign Application Priority Data
Sep. 16, 2005 (JP) ............... 2005-270656

(51) Int. Cl.
*G06F 19/00* (2006.01)
(52) U.S. Cl. .................................... 700/165
(58) Field of Classification Search .......... 700/29, 700/32, 165, 166, 299, 300
See application file for complete search history.

(56) References Cited

U.S. PATENT DOCUMENTS

| | | | | |
|---|---|---|---|---|
| 5,359,872 | A * | 11/1994 | Nashiki | 72/16.1 |
| 5,969,973 | A * | 10/1999 | Bourne et al. | 700/165 |
| 6,233,538 | B1 * | 5/2001 | Gupta et al. | 703/6 |
| 6,415,639 | B1 * | 7/2002 | Kilian et al. | 72/342.1 |
| 6,490,498 | B1 * | 12/2002 | Takagi | 700/159 |
| 6,539,399 | B1 * | 3/2003 | Hazama et al. | 707/104.1 |
| 2001/0026363 | A1 * | 10/2001 | Brinkman et al. | 356/138 |
| 2002/0100308 | A1 * | 8/2002 | Wegener | 72/295 |
| 2006/0065035 | A1 * | 3/2006 | Zhang et al. | 72/342.5 |
| 2006/0216618 | A1 * | 9/2006 | Horgan et al. | 430/58.8 |

FOREIGN PATENT DOCUMENTS

| | | |
|---|---|---|
| JP | 5-177366 | 7/1993 |
| JP | 8-4839 | 1/1996 |
| JP | 2002-239633 | 8/2002 |

OTHER PUBLICATIONS

Liwen et al., FEM simulation of laser forming process of shipbuilding steel plate, 2004, EDP Sciences.*
Radan Computational, Module speeds sheet meatl bending program, Jun. 22, 2004, Engineeringtalk.*

* cited by examiner

*Primary Examiner*—Leo Picard
*Assistant Examiner*—Chad Rapp
(74) *Attorney, Agent, or Firm*—Arent Fox LLP

(57) ABSTRACT

The present invention has been made to provide a laser bending process estimation apparatus, a laser bending process estimation program, and a laser bending process estimation method capable of estimating a result of a laser bending process without an actual workpiece. A laser bending process estimation apparatus that estimates a result of a bending process performed using a laser beam comprises: a process condition acquisition section 1 that acquires a process condition of the bending process; an analysis model creation section 3 that creates an analysis model based on the process condition acquired by the process condition acquisition section 1; and an analysis section 5 that performs heat transfer analysis and heat stress analysis based on the analysis model created by the analysis model creation section 3 to calculate an analysis result of the bending process.

18 Claims, 6 Drawing Sheets

FIG.5

| CONTROL FACTOR | LEVEL 1 | LEVEL 2 | LEVEL 3 |
|---|---|---|---|
| MOVING VELOCITY OF LASER BEAM V | 18.0 | 20.0 | 22.0 |
| LASER OUTPUT W | 0.8 | 1.0 | 1.2 |
| IRRADIATION RADIUS R | 0.1 | 0.3 | 0.5 |
| HEAT TRANSFER COEFFICIENT/ IRRADIATION FRONT SURFACE H1 | $9.0 \times 10^{-6}$ | $10.0 \times 10^{-6}$ | $11.0 \times 10^{-6}$ |
| HEAT TRANSFER COEFFICIENT/ IRRADIATION BACK SURFACE H2 | $10.0 \times 10^{-6}$ | $12.0 \times 10^{-6}$ | $14.0 \times 10^{-6}$ |
| NUMBER N OF IRRADIATION | 2 | 1 | |
| WORKPIECE THICKNESS t | 0.02 | 0.025 | 0.03 |
| IRRADIATION POSITION P | P1 | P2 | P3 |

FIG.6

| No. | NUMBER N OF IRRADIATION | MOVING VELOCITY OF LASER BEAM V | LASER OUTPUT W | WORKPIECE THICKNESS t | IRRADIATION RADIUS R | IRRADIATION FRONT SURFACE H1 ($\times 10^{-6}$) | IRRADIATION BACK SURFACE H2 ($\times 10^{-6}$) | IRRADIATION POSITION P |
|---|---|---|---|---|---|---|---|---|
| 1 | 2 | 18.0 | 0.8 | 0.02 | 0.1 | 9.0 | 10.0 | P1 |
| 2 | 2 | 18.0 | 1.0 | 0.025 | 0.2 | 10.0 | 12.0 | P2 |
| 3 | 2 | 18.0 | 1.2 | 0.03 | 0.3 | 11.0 | 14.0 | P3 |
| 4 | 2 | 20.0 | 0.8 | 0.02 | 0.2 | 10.0 | 14.0 | P3 |
| 5 | 2 | 20.0 | 1.0 | 0.025 | 0.3 | 11.0 | 10.0 | P1 |
| 6 | 2 | 20.0 | 1.2 | 0.03 | 0.1 | 9.0 | 12.0 | P2 |
| 7 | 2 | 22.0 | 0.8 | 0.025 | 0.2 | 11.0 | 12.0 | P3 |
| 8 | 2 | 22.0 | 1.0 | 0.03 | 0.3 | 9.0 | 14.0 | P1 |
| 9 | 1 | 22.0 | 1.2 | 0.03 | 0.3 | 10.0 | 10.0 | P2 |
| 10 | 1 | 18.0 | 0.8 | 0.03 | 0.3 | 10.0 | 12.0 | P1 |
| 11 | 1 | 18.0 | 1.0 | 0.02 | 0.1 | 11.0 | 14.0 | P2 |
| 12 | 1 | 18.0 | 1.2 | 0.025 | 0.2 | 9.0 | 10.0 | P3 |
| 13 | 1 | 20.0 | 0.8 | 0.025 | 0.3 | 9.0 | 14.0 | P2 |
| 14 | 1 | 20.0 | 1.0 | 0.03 | 0.1 | 10.0 | 10.0 | P3 |
| 15 | 1 | 20.0 | 1.2 | 0.02 | 0.2 | 11.0 | 12.0 | P1 |
| 16 | 1 | 22.0 | 0.8 | 0.03 | 0.2 | 11.0 | 10.0 | P2 |
| 17 | 1 | 22.0 | 1.0 | 0.02 | 0.3 | 9.0 | 12.0 | P3 |
| 18 | 1 | 22.0 | 1.2 | 0.025 | 0.1 | 10.0 | 14.0 | P1 |

FIG.7

| No. | BENDING AMOUNT | No. | BENDING AMOUNT |
|---|---|---|---|
| 1 | $1.25 \times 10^{-3}$ | 10 | $5.28 \times 10^{-3}$ |
| 2 | $3.65 \times 10^{-3}$ | 11 | $4.12 \times 10^{-3}$ |
| 3 | $5.28 \times 10^{-3}$ | 12 | $3.25 \times 10^{-3}$ |
| 4 | $2.23 \times 10^{-3}$ | 13 | $5.23 \times 10^{-3}$ |
| 5 | $3.65 \times 10^{-3}$ | 14 | $3.28 \times 10^{-3}$ |
| 6 | $4.29 \times 10^{-3}$ | 15 | $2.18 \times 10^{-3}$ |
| 7 | $2.24 \times 10^{-3}$ | 16 | $4.68 \times 10^{-3}$ |
| 8 | $1.98 \times 10^{-3}$ | 17 | $2.73 \times 10^{-3}$ |
| 9 | $4.26 \times 10^{-3}$ | 18 | $5.64 \times 10^{-3}$ |

FIG.8

| No. | ERROR | No. | ERROR |
|---|---|---|---|
| 1 | $7.562 \times 10^{-6}$ | 10 | $1.638 \times 10^{-6}$ |
| 2 | $0.123 \times 10^{-6}$ | 11 | $0.014 \times 10^{-6}$ |
| 3 | $1.638 \times 10^{-6}$ | 12 | $0.563 \times 10^{-6}$ |
| 4 | $3.133 \times 10^{-6}$ | 13 | $1.513 \times 10^{-6}$ |
| 5 | $0.250 \times 10^{-6}$ | 14 | $0.518 \times 10^{-6}$ |
| 6 | $0.084 \times 10^{-6}$ | 15 | $3.312 \times 10^{-6}$ |
| 7 | $3.098 \times 10^{-6}$ | 16 | $0.462 \times 10^{-6}$ |
| 8 | $4.080 \times 10^{-6}$ | 17 | $1.613 \times 10^{-6}$ |
| 9 | $0.068 \times 10^{-6}$ | 18 | $2.690 \times 10^{-6}$ |

FIG.9

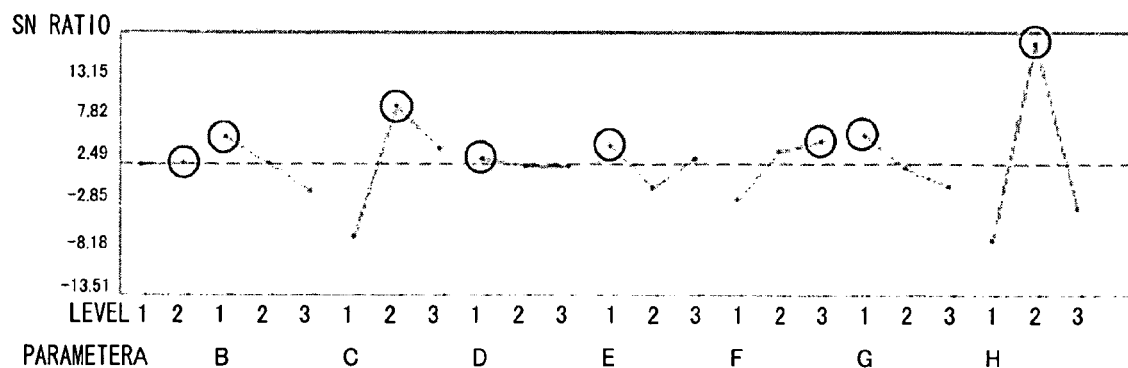

BENDING PROCESS ESTIMATION APPARATUS, BENDING PROCESS ESTIMATION PROGRAM, AND BENDING PROCESS ESTIMATION METHOD

BACKGROUND OF THE INVENTION

1. Field of the Invention

The present invention relates to a bending process estimation apparatus, a bending process estimation program, and a bending process estimation method that estimate the result of a bending process.

2. Description of the Related Art

A bending process for plate forming using a laser beam has been used in a situation where high processing accuracy is required. This is a technique that irradiates a plate with a laser beam to cause thermal gradient in the thickness direction of the plate to thereby bend the plate. For example, this laser bending process for plate has been used in the case where deviations in the pitch and roll angles are corrected in a suspension process for HDD (Hard Disk Drive).

Conventionally, at the time of launching a manufacturing process for a new model, a large number of samples are used, a laser beam is irradiated onto the samples (workpiece materials) under various process conditions to acquire the bending amounts, and thereby a relationship between the process condition and bending amount is determined based on a large amount of acquired data. At this time, a laser beam is irradiated onto various positions of the workpiece under various irradiation conditions to thereby find a relationship between process/correction condition corresponding to process/correction position and process/correction amount. In order to find out a process/correction condition under which a desired bending amount can be obtained as described above, a great deal of experience and know-how is required. If past experience or know-how has been accumulated, it is possible to make use of it for setting process/correction condition for a new model. On the other hand, however, if past experience or know-how has not been accumulated, many more work units are required to set the process/correction condition. The term "process condition" used here includes laser output, irradiation diameter of a laser beam onto a plate, moving velocity of a laser beam, and the like.

As a prior art related to the present invention, Jpn. Pat. Appln. Laid-Open Publication No. 2002-239633 is known. In the method of creating a process condition database for plate process machine disclosed in the publication, calculation of a contribution ratio and generation of new explanatory variable are repeated based on the explanatory variable used in determination of control amount of the plate process machine to obtain a regression expression, and the process condition database is created using the regression expression.

However, in the above method of finding the process condition using a large number of samples, an unacceptable large number of hundreds of samples need to be prepared, for example. In order to prepare such a large number of samples, it is necessary to consider cost of materials for sample preparation, separately from the problem of the work units. Particularly, manufacturing unit cost of samples is higher than that at the time of mass production, so that the problem of cost of sample preparation can not be ignored. Further, there is a possibility that samples required to find out the process condition cannot be prepared. Furthermore, it is impossible to obtain data for determining the process/correction condition at all in a state where an actual workpiece has not been completed. Accordingly, it is impossible to estimate how much bending can be done by the irradiation of a laser beam or how much the pitch angle is changed when the roll angle is corrected.

Further, in the future, the size of a workpiece is expected to be further reduced to limit laser beam irradiation area, so that it becomes necessary to design the workpiece with a laser bending process applied thereto in mind.

SUMMARY OF THE INVENTION

The present invention has been made to solve the above problems, and an object thereof is to provide a laser bending process estimation apparatus, a laser bending process estimation program, and a laser bending process estimation method capable of estimating a result of a laser bending process without an actual workpiece.

To solve the above problems, according to a first aspect of the present invention, there is provided a bending process estimation apparatus that estimates bending process for a workpiece material using heat energy applied to the workpiece material, comprising: a process condition acquisition section that acquires a process condition of the bending process; an analysis model creation section that creates an analysis model based on the process condition acquired by the process condition acquisition section; and an analysis section that performs heat transfer analysis and heat stress analysis for the workpiece material based on the analysis model created by the analysis model creation section to calculate an analysis result of the bending process for the workpiece material.

Further, the bending process estimation apparatus according to the present invention, the apparatus is a laser bending process estimation apparatus which uses a laser beam so as to apply heat energy to the workpiece material.

Further, the bending process estimation apparatus according to the present invention further comprises an analysis condition determination section that allocates parameters corresponding to the process conditions acquired by the process condition acquisition section to an orthogonal table to thereby determining a plurality of analysis conditions which are combinations of the parameters. The analysis section performs heat transfer analysis and heat stress analysis based on the analysis conditions determined by the analysis condition determining section and the analysis model created by the analysis model creation section to thereby calculate an analysis result of bending process for each analysis condition. The bending process estimation apparatus further comprises a factor analysis section that performs factor analysis based on the analysis conditions determined by the analysis condition determination section and analysis results calculated by the analysis section to thereby calculate the combination of the parameters most appropriate for a desired bending process.

Further, in the bending process estimation apparatus according to the present invention, the analysis section further performs heat transfer analysis and heat stress analysis based on the most appropriate combination of the parameters calculated by the factor analysis section and analysis model created by the analysis model creation section to thereby calculate an analysis result of bending process corresponding to the most appropriate combination of the parameters.

Further, the bending process estimation apparatus according to the present invention comprises an analysis model creation condition calculation section that calculates a minimum number of partitions for creating the analysis model based on the process conditions acquired by the process condition acquisition section so as to output the calculated minimum number of partitions to the analysis model creation section.

Further, the bending process estimation apparatus according to the present invention comprises an analysis result determination section that determines whether the analysis result calculated by the analysis section falls within a predetermined range.

According to a second aspect of the present invention, there is provided a bending process estimation program allowing a computer to execute a laser bending process estimation method that estimates a result of a bending process performed using heat energy, the program allowing the computer to execute: a process condition acquisition step that acquires a process condition of the bending process; an analysis model creation step that creates an analysis model based on the process condition acquired by the process condition acquisition step; and an analysis step that performs heat transfer analysis and heat stress analysis based on the analysis model created by the analysis model creation step to calculate an analysis result of the bending process.

Further, the bending process estimation program according to the present invention allows the computer to execute, after the analysis model creation step and before the analysis step, an analysis condition determination step that allocates parameters corresponding to the process conditions acquired by the process condition acquisition step to an orthogonal table to thereby determining a plurality of analysis conditions which are combinations of the parameters. The analysis step performs heat transfer analysis and heat stress analysis based on the analysis conditions determined by the analysis condition determining step and the analysis model created by the analysis model creation step to thereby calculate an analysis result of bending process for each analysis condition. The laser bending process estimation program further allows the computer to execute, after the analysis step, a factor analysis step that performs factor analysis based on the analysis conditions determined by the analysis condition determination step and analysis results calculated by the analysis step to thereby calculate the combination of the parameters most appropriate for a desired bending process.

Further, the bending process estimation program according to the present invention further allows the computer to execute, after the factor analysis step, a check step that performs heat transfer analysis and heat stress analysis based on the most appropriate combination of the parameters calculated by the factor analysis step and analysis model created by the analysis model creation step to thereby calculate an analysis result of bending process corresponding to the most appropriate combination of the parameters.

Further, the bending process estimation program according to the present invention further allows the computer to execute, after the process condition acquisition step and before the analysis model creation step, an analysis model creation condition calculation step that calculates a minimum number of partitions for creating the analysis model based on the process conditions acquired by the process condition acquisition step so as to output the calculated minimum number of partitions to the analysis model creation step.

Further, the bending process estimation program according to the present invention further allows the computer to execute, after the check step, an analysis result determination step that determines whether the analysis result calculated by the check step falls within a predetermined range.

Further, the bending process estimation program according to claim 7, the bending process estimation method is a laser bending process estimation method that estimates a result of a bending process performed using a laser beam.

According to a third aspect of the present invention, there is provided a bending process estimation method that estimates a result of a bending process performed using heat energy, comprising: a process condition acquisition step that acquires a process condition of the bending process; an analysis model creation step that creates an analysis model based on the process condition acquired by the process condition acquisition step; and an analysis step that performs heat transfer analysis and heat stress analysis based on the analysis model created by the analysis model creation step to calculate an analysis result of the bending process.

According to the present invention, process conditions of the bending process performed using a laser beam can efficiently be estimated. Further, the number of samples to be used can be further reduced as compared to a conventional technique. As a result, it is possible to significantly reduce the cost involved with a bending process test. Further, the use of a technique of quality engineering reduces analysis time and allows the most appropriate condition to be calculated more efficiently.

BRIEF DESCRIPTION OF THE DRAWINGS

FIG. 5 is a table showing examples of the control factors and levels;

FIG. 6 is a table showing a concrete example of the orthogonal table;

FIG. 7 is a table showing a concrete example of a result of the second order analysis;

FIG. 8 is concrete examples of errors; and

FIG. 9 is a graph showing concrete example of the SN ratios.

DETAILED DESCRIPTION OF THE PREFERRED EMBODIMENTS

An embodiment of the present invention will be described below with reference to the accompanying drawings. The embodiment will be described as a case which uses a laser beam applying heat energy to a workpiece material.

Firstly, a configuration of a laser bending process estimation apparatus according to the present invention will be described.

Figure 1:
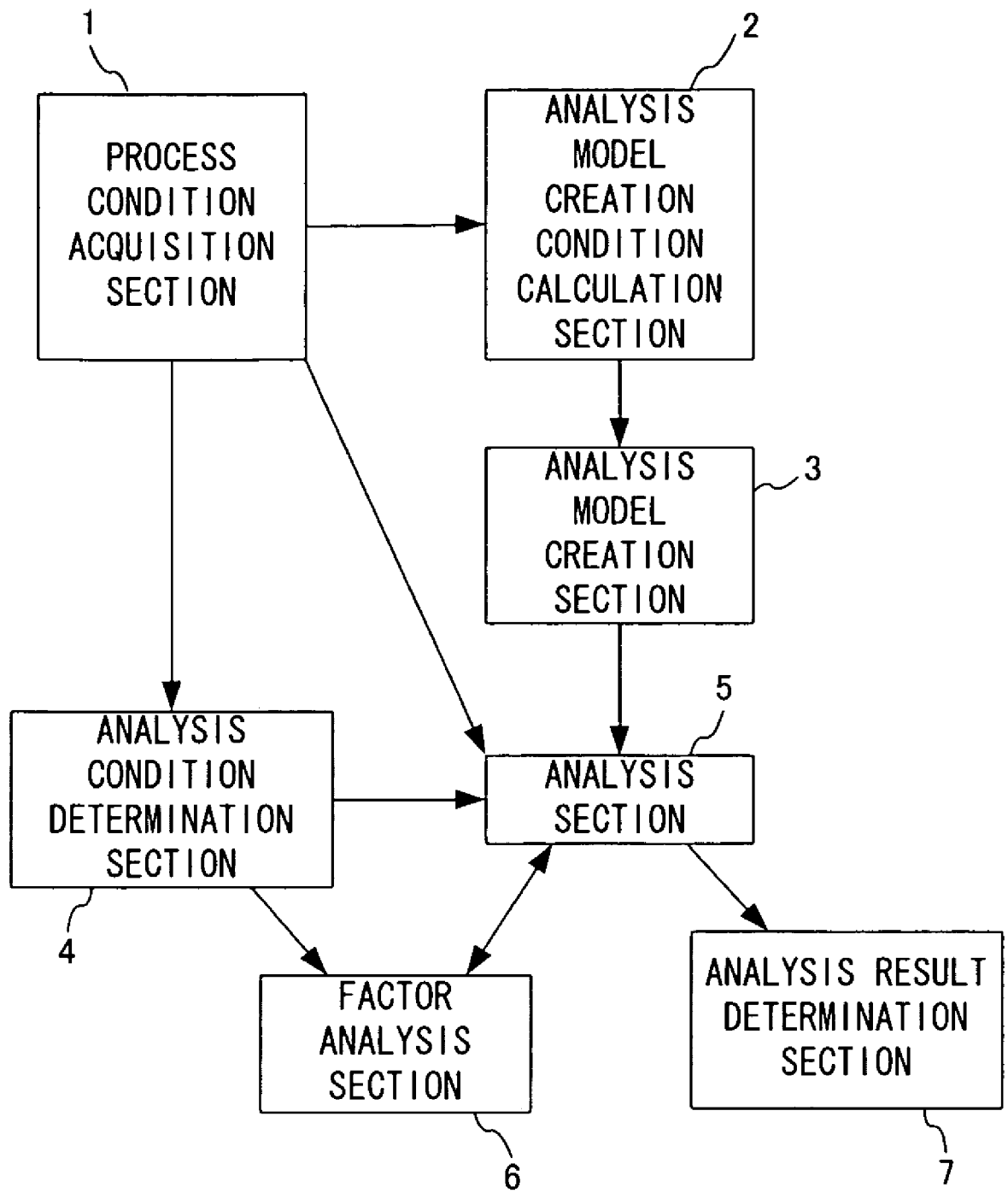
FIG. 1 is a block diagram showing an example of a laser bending process estimation apparatus according to the present invention.

FIG. 1 is a block diagram showing an example of the laser bending process estimation apparatus according to the present invention. The laser bending process estimation apparatus includes a process condition acquisition section 1, an analysis model creation condition calculation section 2, an analysis model creation section 3, an analysis condition determination section 4, an analysis section 5, a factor analysis section 6, and an analysis result determination section 7. The analysis model creation section 3 is realized by, for example, a mesh modeler. The analysis section 5 is realized by, for example, a general-purpose finite element analysis program. The factor analysis section 6 is realized by, for example, a statistical analysis tool.

Next, operation of the laser bending process estimation apparatus will be described.

Figure 2:
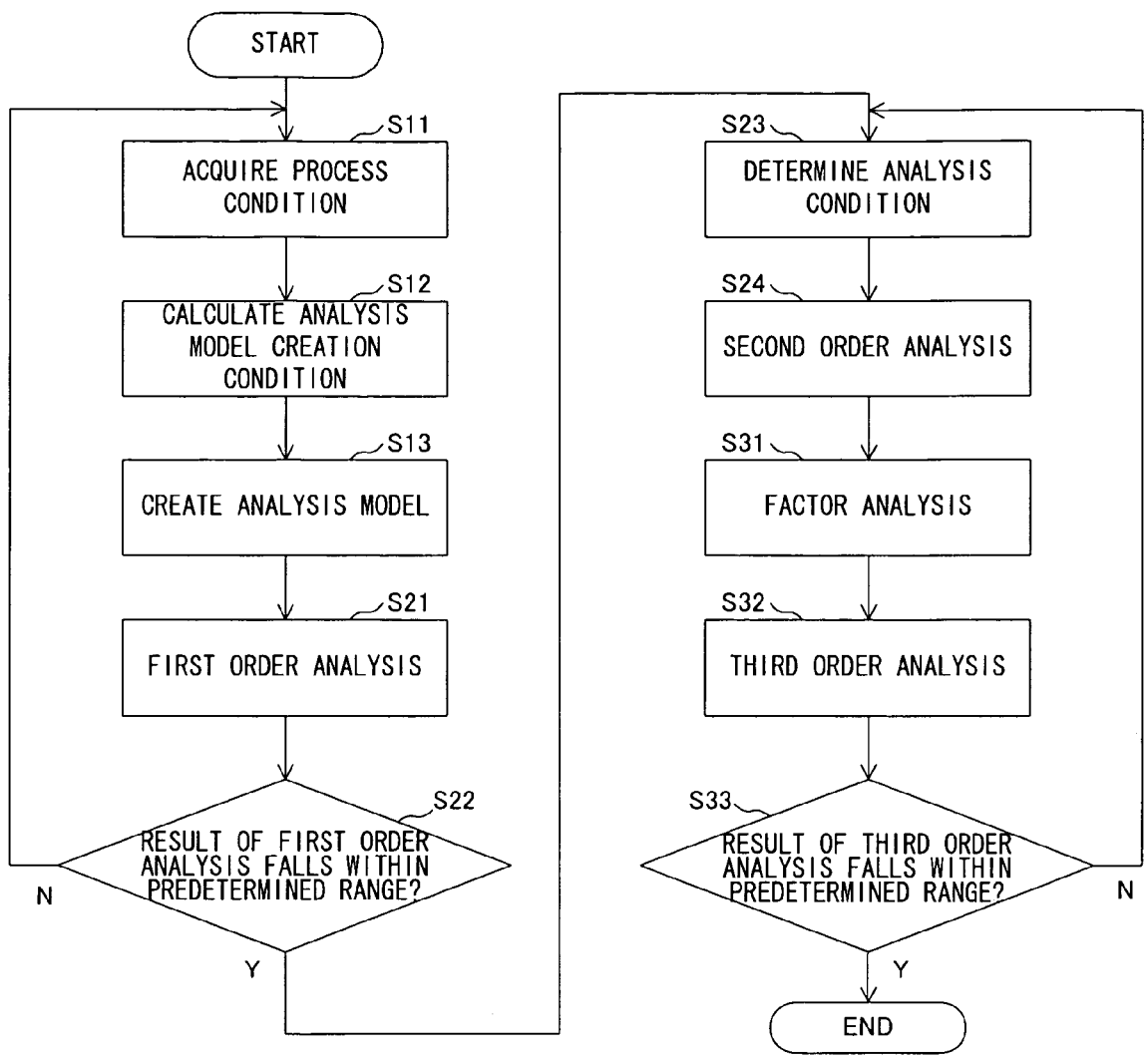
FIG. 2 is a flowchart showing an example of operation of the laser bending process estimation apparatus according to the present invention.

FIG. 2 is a flowchart showing an example of operation of the laser bending process estimation apparatus according to the present invention. Firstly, the process condition acquisition section 1 acquires a process condition in response to a user's input operation (S11). Concrete examples of the process conditions to be acquired are as follows.

1. Laser output; PL=1.0 [W]
2. Laser type; T=YAG laser
3. Irradiation diameter; R=0.1 [mm]
4. Moving velocity of laser beam;
    Vx=20.0 [mm/sec],
    Vy=0.0 [mm/sec]
5. Workpiece material; M=Stainless steel (SUS)
6. Approximate dimension of workpiece (W×H×t);
    10×25×0.025 [mm]

The reason for inputting the laser type is that distribution of irradiation energy differs depending on the laser type. The energy distribution of the YAG (Yttrium Aluminum Garnet) laser of this example is Gaussian distribution; whereas that of the laser diode is trapezoidal distribution. In the case of particular kind of energy distribution, a distribution expression corresponding to the energy distribution is separately input. When inputting the laser type, a user may select a desired one from the types of lasers or distribution expressions previously set in the process condition acquisition section 1, or may directly input a desired one to the process condition acquisition section 1.

In the case where there is an object other than the workpiece, the process condition acquisition section 1 acquires the physical property value of the material of the object based on the user's input. The object other than the workpiece is an object that contacts the workpiece for, for example, supporting the workpiece and is made of a material different from that of the workpiece. In this example, the workpiece is made of a single material (stainless), so that the input of the object other than the workpiece is omitted.

Figure 3:
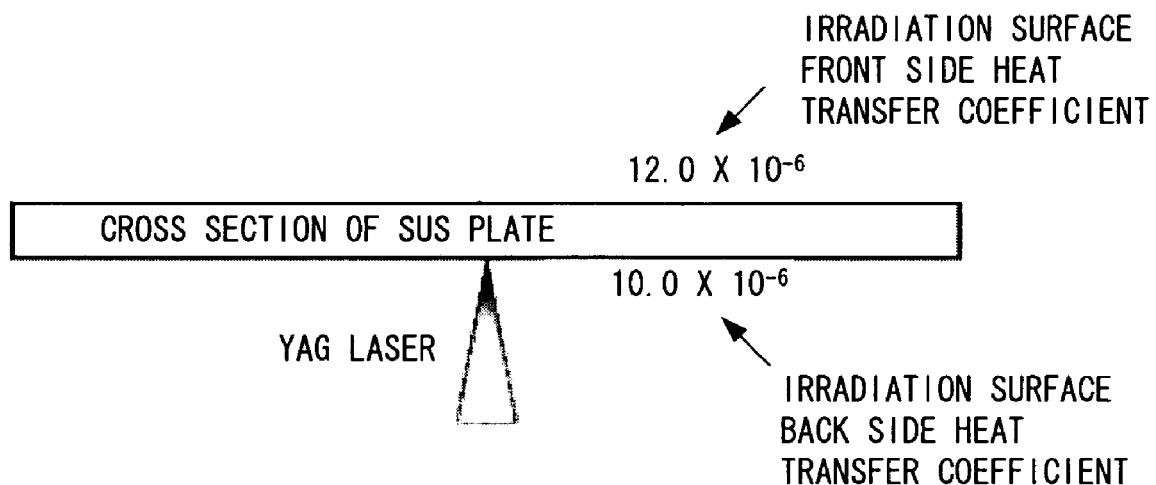
FIG. 3 is a view showing a concrete example of the heat transfer coefficients of a SUS plate.

Further, the process condition acquisition section 1 acquires other process conditions required for analysis based on the user's input. The process conditions here include heat transfer coefficient, initial air temperature, irradiation start position, light-heat absorption rate, and threshold value of heat flow rate. FIG. 3 is a view showing a concrete example of the heat transfer coefficients of a SUS plate.

The user inputs, as the heat transfer coefficient, an irradiation surface front side heat transfer coefficient which is a heat transfer coefficient of front side irradiation surface and respective cross-sections and irradiation surface back side heat transfer coefficient which is a heat transfer coefficient of back side irradiation surface. The heat transfer coefficient differs depending on the condition of surface treatment, and in this example, the back side irradiation surface has a heat transfer coefficient different from that of the front side irradiation surface and respective cross-sections. The user inputs, as the light-heat absorption rate, a rate at which a light (laser beam) becomes heat and is absorbed by the plate material. All light energy of the laser beam is not transformed into heat and energy loss may occur, so that it is necessary to input the light-heat absorption rate for calculation of a process amount. The light-heat absorption rate is a value that varies depending on the condition of the surface treatment or material of the workpiece. The heat in the position away from the irradiation center of a laser beam that exhibits Gaussian distribution is so small that there occurs no change in the bending amount and the like even if calculation is made with a heating value is assigned to the expression. Therefore, the user inputs a threshold value of heat flow rate so that the calculation is made with the heating value equal to or less than the threshold value regarded as 0. Concrete examples of the process conditions to be acquired are as follows.

1. Boundary condition; heat transfer coefficient [W/mm$^2 \cdot °$C.]
    Heat transfer coefficient of front side irradiation surface=10.0×10$^{-6}$ [W/mm$^2 \cdot °$C.]
    Heat transfer coefficient of back side irradiation surface=12.0×10$^{-6}$ [W/mm$^2 \cdot °$C.]
2. Initial air temperature; $T_0$=25.0 [° C.]
3. Irradiation start position;

$X_0$=5.0 $Y_0$=0.0 $Z_0$=0.0

4. Light-heat absorption rate; A=0.35
5. Threshold of heat flow rate; HL=0.01

The irradiation start position is given by the coordinate ($X_0$, $Y_0$, $Z_0$). Actually, however, irradiation is started at the position away from a workpiece by the irradiation diameter, so that coordinate conversion is made so as to set the analysis start position to ($X_0'$, $Y_0'$, $Z_0'$). In this example, a laser beam is moved on XY plane, so that $Z_0'$ is set to 0.0 (=$Z_0$). Alternatively, however, a laser beam may be moved three-dimensionally.

$$X_0' = X_0 - (Vx/|Vx|) \cdot R = 4.9$$

$$Y_0' = Y_0 - (Vy/|Vy|) \cdot R = 0.0$$

$$Z_0' = Z_0 = 0.0$$

(Vx/|Vx|) represents x component of laser moving direction, and (Vy/|Vy|) represents y component of laser moving direction. Further, the above expressions represent that when the irradiation center of a laser beam is started from ($X_0'$, $Y_0'$, $Z_0'$) and moved by the irradiation diameter, it reaches ($X_0$, $Y_0$, $Z_0$).

The analysis model creation condition calculation section 2 calculates an analysis model creation condition based on the process conditions acquired by the process condition acquisition section 1 (S12). The analysis model creation condition calculation section 2 assigns the process conditions to the formula for a minimum number of partitions used in heat transfer analysis to calculate the minimum number of partitions in the plate thickness direction and, after that, calculates a minimum dimension of elements. The minimum number of partitions in the plate thickness direction may be acquired according to a user's input. Subsequently, the analysis model creation condition calculation section 2 calculates the incremental value of unsteady heat transfer analysis in terms of time and irradiation target element width. The time incremental value $\Delta t$ of unsteady heat transfer analysis is calculated from $\Delta t \leq 0.4 \cdot C \cdot (\Delta X)^2 / \lambda$, where $\lambda$ represents heat conductivity, and C represents heat capacity=$\rho \cdot \gamma$ (specific heat×specific weight). The irradiation target element width b represents the width for limiting the irradiation target element to which a heat flux is to be given by a laser beam among the elements of irradiation surfaces and is calculated from b=B×2R, where B is set to 2 to 3, as a guideline. Further, the irradiation target element width is utilized for increasing analysis efficiency by limiting the irradiation target element. The utilization of the setting of the irradiation target element width may be omitted in the case where there is a sufficient calculating power. Concrete examples of the analysis model creation conditions are as follows.

1. Minimum number of partitions in plate thickness direction (n≧4); n=4
2. Minimum dimension of element; ΔX=0.025/4=0.00625 [mm]
3. Time incremental value of unsteady heat transfer analysis in case where stainless is used as material; $\Delta t = 1.0 \times 10^{-5}$ [sec] or less
4. Irradiation target element width; b=3×2·0.1=0.6 [mm]

Figure 4:
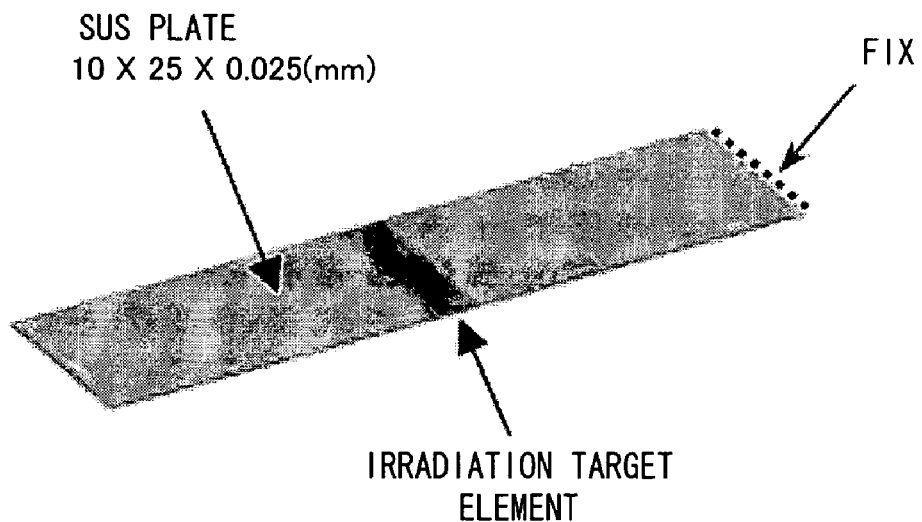
FIG. 4 is a view showing a concrete example of the analysis model.

Next, the analysis model creation section 3 creates an analysis model based on the analysis model creation conditions acquired by the analysis model creation condition calculation section 2 (S13). As the analysis model creation section 3, a commonly-used mesh modeler is used. FIG. 4 is a view showing a concrete example of the analysis model. The analysis model of FIG. 4 represents the stainless plate described in the above example, which has been obtained by dividing the workpiece into the minimum dimension of element.

Next, the analysis section 5 performs a first order analysis according to the analysis conditions which are combinations of the parameters obtained from the process conditions (S21). As the analysis conditions for the first order analysis, which are determined from the above process conditions, eight parameters are shown below. The irradiation start position is a point previously set and represented by P1, P2, P3.

A. Number N of irradiation=1 [time]
B. Moving velocity V of laser beam=20.0 [mm/sec]
C. Laser output PL=1.0 [W]
D. Workpiece thickness t=0.025 [mm]
E. Irradiation radius RL=0.3 [mm]
F. Irradiation surface front side heat transfer coefficient=$10.0 \times 10^{-6}$ [W/mm$^2 \cdot °$C.]
G. Irradiation surface back side heat transfer coefficient=$12.0 \times 10^{-6}$ [W/mm$^2 \cdot °$C.]
H. Irradiation start position=P1

Next, the analysis result determination section 7 checks whether the bending amount obtained as a result of the first order analysis falls within a predetermined range (S22). When the bending amount does not fall within a predetermined amount (No in S22), the flow shifts to the step S11, where the process conditions are acquired and analysis is performed again.

On the other hand, when the bending amount falls within a predetermined range (Yes in S22), the analysis condition determination section 4 uses levels previously set in the respective parameters to allocate the parameters to an orthogonal table, thereby determining analysis conditions for a second order analysis (S23). A concrete example of the process of determining the analysis conditions will be described. Firstly, levels of the respective parameters serving as control factors are previously set. FIG. 5 is a table showing examples of the control factors and levels. The parameters to be used as control factors are the abovementioned eight parameters A to H, and three levels are set for respective parameters. Then, allocation of the levels to the orthogonal table is performed. FIG. 6 is a table showing a concrete example of the orthogonal table. Here, L18 is used as the orthogonal table. The analysis condition determination section 4 allocates levels to the orthogonal table and thereby 18 combinations of parameters, which serve as the analysis conditions, can be obtained.

Next, the analysis section 5 performs the second order analysis according to the allocation table output by the analysis condition determination section 4 (S24). FIG. 7 is a table showing a concrete example of a result of the second order analysis. The table shows 18 bending amounts that the analysis section 5 has obtained as a result of the analysis corresponding to the above concrete examples of the 18 combinations of the analysis conditions.

Next, the factor analysis section 6 uses the analysis conditions and result of the second order analysis to perform factor analysis based on quality engineering to thereby determine a combination of parameters closest to a desired bending amount (S31). That is, the factor analysis section 6 firstly calculates an error from a target value. Assuming that a bending amount which is the result of the second order analysis is Xn, and a target value of the bending amount is Xt, error ΔX can be obtained from the following expression.

$$\Delta X = (Xn - Xt)^2$$

FIG. 8 is concrete examples of errors. Theses 18 errors correspond to the abovementioned 18 combinations of the analysis conditions. The factor analysis section 6 uses the acquired errors to calculate SN ratio of the respective levels of the parameters. FIG. 9 is a graph showing concrete example of the SN ratios. The horizontal axis represents the respective levels (FIG. 5) of the parameters, and vertical axis represents the SN ratio. In this case, the factor analysis section 6 compares SN ratios of the respective levels for respective 8 parameters. Subsequently, the factor analysis section 6 performs the comparison of SN ratios and selects a level at which the SN ratio becomes the largest value for each parameter. A combination of the parameters that has been selected as described above is the most appropriate combination of parameters, which is closest to a desired bending amount. The levels selected for each parameter are shown as follows.

A. Number N of irradiation=2 [time]
B. Moving velocity V of laser beam=18.0 [mm/sec]
C. Laser output PL=1.0 [W]
D. Workpiece thickness t=0.02 [mm]
E. Irradiation radius RL=0.1 [mm]
F. Irradiation surface front side heat transfer coefficient=$11.0 \times 10^{-6}$ [W/mm$^2 \cdot °$C.]
G. Irradiation surface back side heat transfer coefficient=$10.0 \times 10^{-6}$ [W/mm$^2 \cdot °$C.]
H. Irradiation start position=P2

Next, the analysis section 5 uses the most appropriate combination of parameters acquired by the factor analysis section 6 to perform third order analysis for checking whether a desired bending amount can be obtained or not (S32). The analysis result determination section 7 then determines whether the bending amount obtained as a result of the third order analysis falls within a predetermined range (S33). When the obtained bending amount falls within a predetermined range (Yes in S33), this flow is ended, and the obtained combination of the parameters is applied to a laser process machine to perform an actual laser process. On the other hand, the obtained bending amount does not fall within a predetermined range (No in S33), the flow returns to step S23, where allocation of the analysis conditions is made again.

Details of the operation of the analysis section 5 will next be described.

The analysis section 5 firstly performs heat transfer analysis. In the heat transfer analysis, the position at which heat is generated is changed by moving a laser beam at moving velocity of a laser beam and thereby heat flux is given to the integration points on the solid element surface. The heat transfer analysis is ended at the time point when analysis time of 0.25 seconds has elapsed from the start of irradiation, or temperature becomes equal to or less than $1.0 \times 10^{-4}$° C. The heat flux induced by a laser beam is calculated by a subroutine.

In the subroutine, the moving distance of a laser beam and moving velocity of a laser beam are calculated to give a heat flux for each step time and each integration point on the solid element surface. Assuming that the output of a laser beam is P1 [W], light-heat absorption rate is A, and irradiation radius is R1 [mm], the intensity $I_0$ obtained at the center of laser beam can be represented by the following expression.

$$I_0 = 2 \cdot P1 \cdot A/(\pi \cdot R1^2)$$

Assuming that a laser with Gaussian distribution is used, the intensity I(r) of the laser beam at the position away from the center by a distance of r can be represented by the following expression.

$$I(r) = I_0 \cdot EXP(-2r/R1)$$

The heat flux is given to the integration points on a first surface of the target element sets simultaneously. Further, the heat flux to be given is calculated depending on the distance between the irradiation point at a given time point and respective integration points. In the case where the value of the heat flux becomes equal to or less than 0.01 at the integration point far away from the irradiation position, the value of the heat flux is set to 0. Further, an irradiation route is previously set as an expression that represents the irradiation position at a given time point by using the irradiation start position and moving velocity of a laser beam.

Next, the analysis section 5 refers to a result of the heat transfer analysis to perform heat stress analysis and calculates deformation and distortion.

The determination of the bending position, bending amount, irradiation conditions, and the like in conventional basic data creation process for bending correction has depended upon worker's experience. Further, in the future, the size of a workpiece is expected to be further reduced to limit the area of laser beam irradiation used for the bending correction.

It is assumed that the abovementioned laser bending process estimation apparatus is applied to a suspension process for HDD. In this case, when a design development can be forwarded with correction positions for the deviation previously incorporated based on analysis that is performed using the laser bending process estimation apparatus of the present invention in the planning stage of a new suspension, work units or cost for obtaining the correction positions or irradiation conditions of a laser beam can be reduced in a correction process performed at the end stage of manufacturing process of a product.

More specifically, an analysis division reveals changes in roll angle and pitch angle obtained when a laser beam is irradiated on specified positions on a suspension to deform the suspension based on analysis performed using the laser bending process estimation apparatus and feeds back the obtained information to a design division. The design division designs a product with reference to the information, thereby determining correction condition (laser irradiation condition) with a small amount of samples in a correction process performed at the end stage of manufacturing process of the product.

The analysis result determination section 7 provided in the above embodiment may be omitted. In this case, the laser bending process estimation apparatus presents analysis results to a user and makes determination based on the user's instruction on the analysis results.

Further, although it is possible to check whether the initial combination of the parameters is appropriate or not by performing the first order analysis, the determination of analysis conditions can be made without the performance of the first order analysis.

Further, although it is possible to perform final check of the parameters by performing the third order analysis, a combination of the parameters acquired by the factor analysis section 6 is directly applied to the laser process machine without the performance of the third order analysis.

Further, it is possible to provide a program that allows a computer constituting the laser bending process estimation apparatus to execute the above steps as a laser bending process estimation program. By storing the above program in a computer-readable storage medium, it is possible to allow the computer constituting the laser bending process estimation apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

A process condition acquisition step corresponds to step S11 in the embodiment. An analysis model creation condition calculation step corresponds to step S12 in the embodiment. An analysis model creation step corresponds to step S13 in the embodiment. An analysis condition determination step corresponds to step S23 in the embodiment. An analysis step corresponds to step S24 in the embodiment. A factor analysis section corresponds to step S31 in the embodiment. A check step corresponds to step S32 in the embodiment. An analysis result determination step corresponds to step S33 in the embodiment.

What is claimed is:

1. A bending process estimation apparatus that estimates bending process for a workpiece material using heat energy applied to the workpiece material, comprising:

a process condition acquisition section that acquires a process condition of the bending process;

an analysis model creation section that creates an analysis model based on the process condition acquired by the process condition acquisition section; and an analysis section that performs heat transfer analysis and heat stress analysis for the workpiece material based on the analysis model created by the analysis model creation section to calculate an analysis result of the bending process for the workpiece material.

2. The bending process estimation apparatus according to claim 1, the apparatus is a laser bending process estimation apparatus which uses a laser beam so as to apply heat energy to the workpiece material.

3. The bending process estimation apparatus according to claim 1, further comprising an analysis condition determination section that allocates parameters corresponding to the process conditions acquired by the process condition acquisition section to an orthogonal table to thereby determining a plurality of analysis conditions which are combinations of the parameters, wherein the analysis section performs heat transfer analysis and heat stress analysis based on the analysis conditions determined by the analysis condition determining section and the analysis model created by the analysis model creation section to thereby calculate an analysis result of bending process for each analysis condition, the bending process estimation apparatus further comprising a factor analysis section that performs factor analysis based on the analysis conditions determined by the analysis condition determination section and analysis results calculated by the analysis section to thereby calculate the combination of the parameters most appropriate for a desired bending process.

4. The bending process estimation apparatus according to claim 3, wherein the analysis section further performs heat transfer analysis and heat stress analysis based on the most appropriate combination of the parameters calculated by the factor analysis section and analysis model created by the analysis model creation section to thereby calculate an analysis result of bending process corresponding to the most appropriate combination of the parameters.

5. The bending process estimation apparatus according to claim 1, further comprising an analysis model creation condition calculation section that calculates a minimum number of partitions for creating the analysis model based on the process conditions acquired by the process condition acquisition section so as to output the calculated minimum number of partitions to the analysis model creation section.

6. The bending process estimation apparatus according to claim 1, further comprising an analysis result determination section that determines whether the analysis result calculated by the analysis section falls within a predetermined range.

7. A bending process estimation program allowing a computer to execute a bending process estimation method that estimates a result of a bending process performed using heat energy, the program allowing the computer to execute:
a process condition acquisition step that acquires a process condition of the bending process;
an analysis model creation step that creates an analysis model based on the process condition acquired by the process condition acquisition step; and
an analysis step that performs heat transfer analysis and heat stress analysis based on the analysis model created by the analysis model creation step to calculate an analysis result of the bending process.

8. The bending process estimation program according to claim 7, further allowing the computer to execute, after the analysis model creation step and before the analysis step, an analysis condition determination step that allocates parameters corresponding to the process conditions acquired by the process condition acquisition step to an orthogonal table to thereby determining a plurality of analysis conditions which are combinations of the parameters, wherein the analysis step performs heat transfer analysis and heat stress analysis based on the analysis conditions determined by the analysis condition determining step and the analysis model created by the analysis model creation step to thereby calculate an analysis result of bending process for each analysis condition, the bending process estimation program further allowing the computer to execute, after the analysis step, a factor analysis step that performs factor analysis based on the analysis conditions determined by the analysis condition determination step and analysis results calculated by the analysis step to thereby calculate the combination of the parameters most appropriate for a desired bending process.

9. The bending process estimation program according to claim 8, further allowing the computer to execute, after the factor analysis step, a check step that performs heat transfer analysis and heat stress analysis based on the most appropriate combination of the parameters calculated by the factor analysis step and analysis model created by the analysis model creation step to thereby calculate an analysis result of bending process corresponding to the most appropriate combination of the parameters.

10. The bending process estimation program according to claim 9, further allowing the computer to execute, after the check step, an analysis result determination step that determines whether the analysis result calculated by the check step falls within a predetermined range.

11. The bending process estimation program according to claim 7, further allowing the computer to execute, after the process condition acquisition step and before the analysis model creation step, an analysis model creation condition calculation step that calculates a minimum number of partitions for creating the analysis model based on the process conditions acquired by the process condition acquisition step so as to output the calculated minimum number of partitions to the analysis model creation step.

12. The bending process estimation program according to claim 7, the bending process estimation method is a laser bending process estimation method that estimates a result of a bending process performed using a laser beam.

13. A bending process estimation computer implemented method that estimates a result of a bending process performed using heat energy, comprising:
a process condition acquisition step that acquires a process condition of the bending process;
an analysis model creation step that creates an analysis model based on the process condition acquired by the process condition acquisition step; and
an analysis step that performs heat transfer analysis and heat stress analysis based on the analysis model created by the analysis model creation step to calculate an analysis result of the bending process.

14. The bending process estimation computer implemented method according to claim 13, further comprising, after the analysis model creation step and before the analysis step, an analysis condition determination step that allocates parameters corresponding to the process conditions acquired by the process condition acquisition step to an orthogonal table to thereby determining a plurality of analysis conditions which are combinations of the parameters, wherein the analysis step performs heat transfer analysis and heat stress analysis based on the analysis conditions determined by the analysis condition determining step and the analysis model created by the analysis model creation step to thereby calculate an analysis result of bending process for each analysis condition, the bending process estimation computer implemented method further comprising, after the analysis step, a factor analysis step that performs factor analysis based on the analysis conditions determined by the analysis condition determination step and analysis results calculated by the analysis step to thereby calculate the combination of the parameters most appropriate for a desired bending process.

15. The bending process estimation computer implemented method according to claim 14, further comprising, after the factor analysis step, a check step that performs heat transfer analysis and heat stress analysis based on the most appropriate combination of the parameters calculated by the factor analysis step and analysis model created by the analysis model creation step to thereby calculate an analysis result of bending process corresponding to the most appropriate combination of the parameters.

16. The bending process estimation computer implemented method according to claim 15, further comprising, after the check step, an analysis result determination step that determines whether the analysis result calculated by the check step falls within a predetermined range.

17. The bending process estimation computer implemented method according to claim 13, further comprising, after the process condition acquisition step and before the analysis model creation step, an analysis model creation condition calculation step that calculates a minimum number of partitions for creating the analysis model based on the process conditions acquired by the process condition acquisition step so as to output the calculated minimum number of partitions to the analysis model creation step.

18. The bending process estimation computer implemented method according to claim 13, the method is a computer implemented laser bending process estimation method that estimates a result of a bending process performed using a laser beam.

* * * * *